United States Patent [19]

Kitzing et al.

[11] 4,216,146
[45] Aug. 5, 1980

[54] AZO(HYDRAZO)-ANTHRAQUINONE COMPOUNDS

[75] Inventors: Rainer Kitzing, Ingatestone; Brian R. D. Whitear, Brentwood; William E. Long, Brentwood; David L. R. Reeves, Brentwood; Glenn P. Wood, Brentwood, all of England

[73] Assignee: Ciba-Geigy AG, Basel, Switzerland

[21] Appl. No.: 14,779

[22] Filed: Feb. 23, 1979

[30] Foreign Application Priority Data

Feb. 28, 1978 [GB] United Kingdom ............... 07785/78

[51] Int. Cl.² ..................... C07C 29/10; C07C 29/36; C07C 97/24
[52] U.S. Cl. ..................... 260/202; 260/152; 260/207; 260/378; 430/170; 430/226; 430/357; 430/390
[58] Field of Search ............... 260/202, 207, 378, 152

[56] References Cited

U.S. PATENT DOCUMENTS

| 2,154,981 | 4/1939 | Gubler et al. | 260/207 |
| 2,884,424 | 4/1959 | Klingsberg | 260/378 X |
| 2,920,072 | 1/1960 | Kolliker et al. | 260/207 |
| 3,541,182 | 11/1970 | Kolliker et al. | 260/202 X |
| 3,622,558 | 11/1971 | Kolliker et al. | 260/207.1 |
| 3,997,519 | 12/1976 | Armbruster | 260/207 X |
| 4,001,204 | 1/1977 | Krutak et al. | 260/152 |
| 4,108,850 | 8/1978 | Fields et al. | 260/152 X |

FOREIGN PATENT DOCUMENTS

| 605988 | 9/1960 | Canada | 260/202 |
| 359811 | 3/1962 | Switzerland | 260/207 |
| 365167 | 12/1962 | Switzerland | 260/207 |
| 603862 | 6/1948 | United Kingdom | 260/202 |
| 781930 | 8/1957 | United Kingdom | 260/202 |
| 798121 | 7/1958 | United Kingdom | 260/202 |
| 832400 | 4/1960 | United Kingdom | 260/202 |
| 838335 | 6/1960 | United Kingdom | 260/202 |
| 1438354 | 6/1976 | United Kingdom | 260/202 |

Primary Examiner—John Doll
Attorney, Agent, or Firm—Sprung, Felfe, Horn, Lynch & Kramer

[57] ABSTRACT

Novel azo(hydrazo)-anthraquinone compounds and their preparation are provided.

These compounds are of the general formula

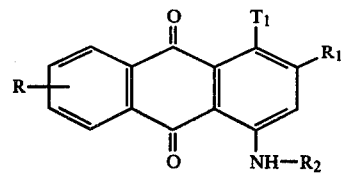

where R is hydrogen or at least one substituent, $T_1$ is hydrogen, an hydroxy or alkoxy group or an amino or substituted amino group, $R_1$ is hydrogen or halogen, an alkoxy, an amino or substituted amino group, an aryl or substituted aryl group, or a group conferring solubility in water and $R_2$ is a group which comprises an azo linkage and a ballasting group or is a group which completes the hydrazo link and which comprises a ballasting group. The new compounds are useful in the photographic field, especially in the photographic dye diffusion transfer process for the production of photographic images.

13 Claims, No Drawings

AZO(HYDRAZO)-ANTHRAQUINONE COMPOUNDS

This invention relates to novel azo(hydrazo)-anthraquinone compounds and to a method of preparing them.

According to the present invention there are provided azo(hydrazo)-anthraquinone compounds of the general formula

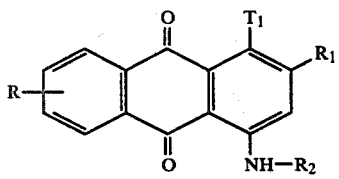

where R is hydrogen or at least one substituent, $T_1$ is hydrogen, an hydroxy or alkoxy group or an amino or substituted amino group, $R_1$ is hydrogen or halogen, an alkoxy, an amino or substituted amino group, an aryl or substituted aryl group, or a group conferring solubility in water and $R_2$ is a group which comprises an azo linkage and a ballasting group or is a group which completes the hydrazo link and which comprises a ballasting group.

$T_1$ in formula (1) is for example hydrogen, hydroxy, alkoxy of 1 to 4 carbon atoms, especially methoxy or ethoxy, amino(—$NH_2$), mono- or dialkylamino (alkyl of 1 to 4 carbon atoms), or acylamino such as acetylamino, $R_1$ is hydrogen, halogen, especially chlorine or bromine, alkoxy of 1 to 4 carbon atoms, amino, mono- or dialkyl($C_1$-$C_4$)amino, acylamino such as acetylamino, phenyl or phenyl substituted by halogen (chlorine and bromine are preferred), alkyl($C_1$-$C_4$) or —$SO_3H$. Preferred groups conferring solubility in water are sulfonate or carboxylate groups.

The substituents R in the benz ring to which the group —NH—$R_2$ is not attached include hydroxy, halogen, amino, substituted amino, alkoxy and sulphonate as mentioned before.

The azo-anthraquinone compounds of formula (1) are of use in a photographic process wherein photographic material which comprises a certain class of azo compounds, which includes the azo-anthraquinone compounds of formula (1), are treated with a reducing agent which breaks the azo link and a dye is liberated which is mordanted in a receiving layer, so forming a dye image. Thus the azo-anthraquinone compounds of formula (1) comprise a diffusible coloured anthraquinone moiety linked by an azo linkage to a group which comprises a ballasting group. The object of the ballasting group is to render the azo-anthraquinone compounds substantive to the layer in the photographic material in which they are coated.

When the azo linkage is cleaved in compounds of formula (1) where $T_1$ is a hydrogen atom a diffusible yellow or orange anthraquinone dye is liberated.

When the azo linkage is cleaved in compounds of formula (1) where $T_1$ is an amino or alkyl amino group a diffusible blue anthraquinone dye is liberated.

When the azo linkage is cleaved in compounds of formula (1) where $T_1$ is an acyl amino group a diffusible red anthraquinone dye is liberated.

When the azo linkage is cleaved in compounds of formula (1) where $T_1$ is an hydroxy or alkoxy group a diffusible magenta anthraquinone dye is liberated.

Preferred azo-anthraquinone compounds of formula (1) are azo-anthraquinone compounds of formula

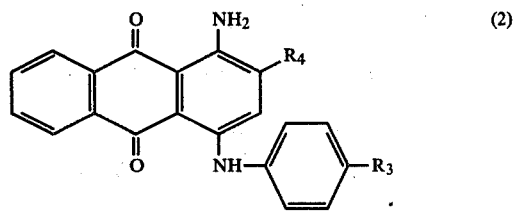

wherein $R_3$ is a group containing an azo group and a ballasting group and $R_4$ is a group which confers water-solubility. A particularly useful group $R_4$ is —$SO_3H$.

Examples of such azo-anthraquinone compounds are the compounds of formula

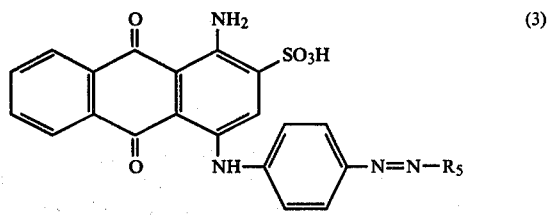

where $R_5$ is a substituted aromatic or heterocyclic group containing a ballasting group.

A particularly useful group $R_5$ is the group of the formula

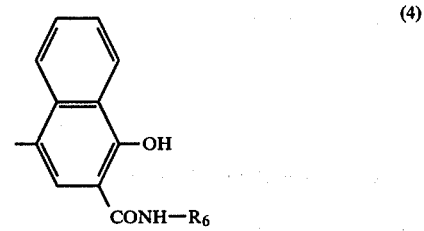

where $R_6$ is either an alkyl group containing at least 10 carbon atoms or a group containing such an alkyl group or an aryl ballasting group.

A useful aryl ballasting group is hereinafter referred to as group B and has the formula

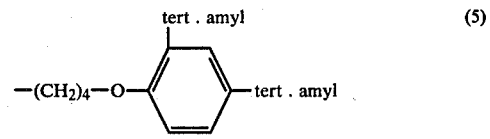

Another useful group $R_6$ is the group of the formula

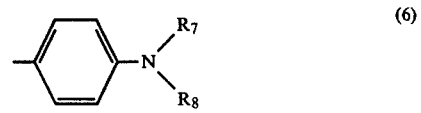

where $R_7$ and $R_8$ are both alkyl groups containing for example 1 to 18 carbons atoms and having together at least 12 carbon atoms.

Compounds of formula (3) may be prepared by diazotising a compound of formula

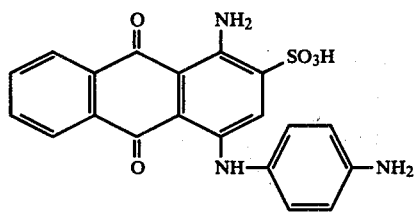 (7)

to yield a diazo compound of the formula

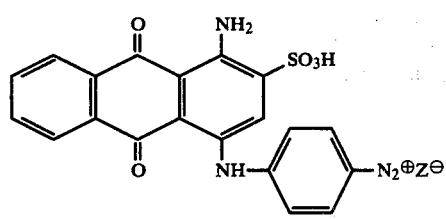 (8)

where $Z^\ominus$ is an anion and then coupling the diazo compound of formula (8) with a coupler of the formula $R_5A^\oplus$ where A is a cation and $R_5$ has the meaning assigned to it above, in alkaline conditions.

An example of an azo-anthraquinone compound of formula (3) is the compound of formula

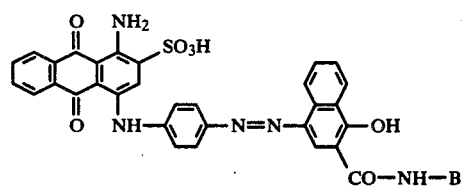 (9)

where B has the meaning assigned to it above.

Another similar compound but which contains a further $SO_3H$ water solubiliting group is the compound of the formula

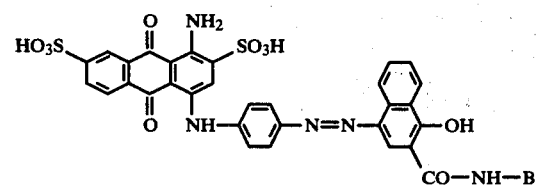 (10)

where B has the meaning assigned to it above.

Other examples of azo-anthraquinones of formula (1) are the azoanthraquinones of formula

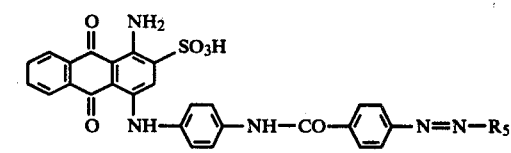 (11)

where $R_5$ has the meaning assigned to it above.

Compounds of formula (11) may be prepared analogously to compounds of formula (3) by diazotising a compound of formula

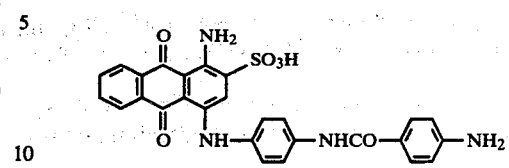 (12)

followed by coupling with a compound $R_5A^\oplus$ Where $R_5$ and A have the meaning assigned to them above.

Alternatively compound of formula (11) may be prepared by preforming an azo compound of formula

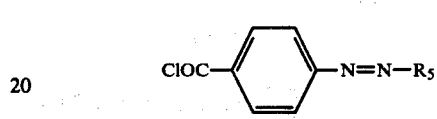 (13)

where $R_5$ has the meaning assigned to it above and then reacting this compound with a compound of formula (7).

An example of a compound of formula (11) is the compound of formula

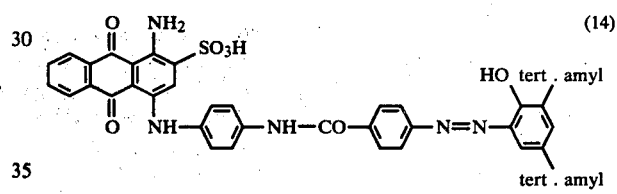 (14)

Another class of useful azo-anthraquinones of formula (1) are compounds of the formula

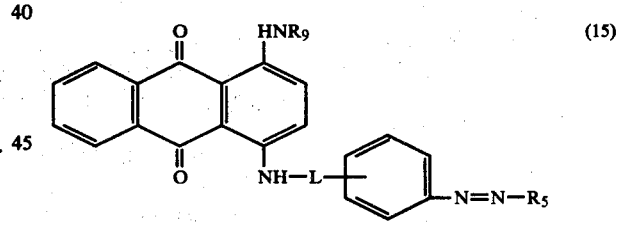 (15)

where $R_5$ has the meaning assigned to it above, $R_9$ is an alkyl group having 1 to 4 carbon atoms and L is a linking group.

Examples of suitable linking groups are amide groups, quaternary ammonium groups and a phenyl group having water solubilising substituents such as sulphonic acid groups which help to solubilise the anthraquinone dye which is liberated when the azo linkage is cleaved. A preferred linking group is an alkylene claim of 2 to 6 carbon atoms, interrupted by a quaternary ammonium group, such as

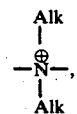

wherein Alk is alkyl of 1 to 4 carbon atoms.

Compounds of formula (15) may be prepared for example either by diazotising a compound of the general formula

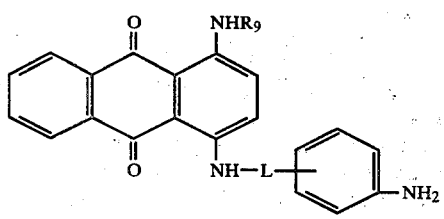
(16)

where $R_9$ has the meaning assigned to it above and then coupling the resultant diazo compound with a coupler of the formula $R_5A^\oplus$ where A is a cation and $R_5$ has the meaning assigned to it above or by reacting a compound of the formula

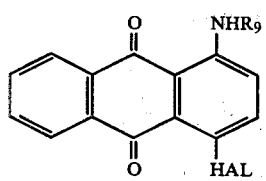
(17)

where $R_9$ has the meaning assigned to it above and Hal is a halogen atom with a preformed azo compound of the formula

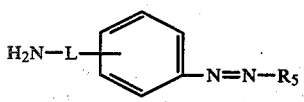
(18)

where L is a linking group and $R_5$ has the meaning assigned to it above.

An example of an azo-anthraquinone compound of formula (15) is the compound of formula

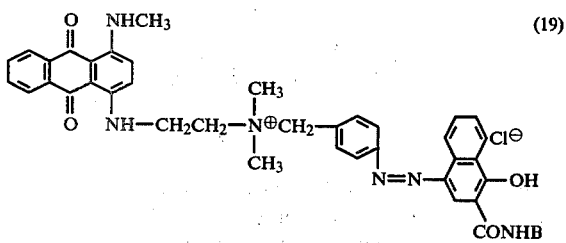
(19)

where B has the meaning assigned to it above.

Another group of useful azo anthraquinones of formula (1) are azo-anthraquinones of formula

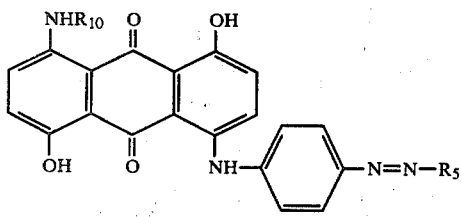
(20)

where $R_5$ has the meaning assigned to it above and $R_{10}$ is a hydrogen atom, an alkyl group having up to 4 carbon atoms or is an optionally substituted phenyl group.

Possible substituents may be hydroxy, halogen (chlorine, bromine), alkyl or alkoxy of 1 to 4 carbon atoms.

Compounds of formula (20) may be made in a similar manner to compounds of formula (3), that is to say diazotisation of a compound of formula

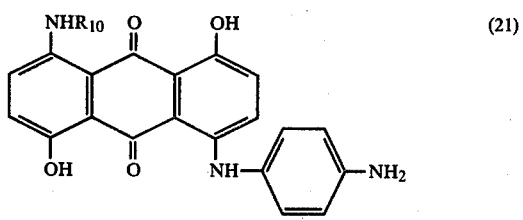
(21)

followed by coupling with a coupler $R_5A^\oplus$ where $A^\oplus$ is a cation and $R_5$ and $R_{10}$ have the meanings assigned to them above.

Another useful group of compounds of general formula (1) are hydrazo-anthraquinones of formula

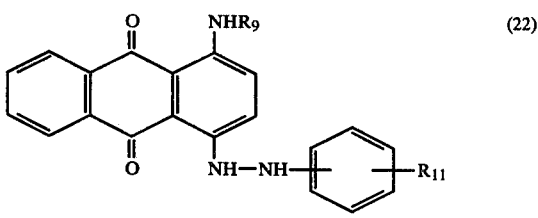
(22)

where $R_9$ has the meaning assigned to it above and $R_{11}$ is either an alkyl group containing at least 10 carbon atoms or is a group which comprises such an alkyl group (alkoxy or alkyl mercapto group of 10 to 24, preferably of 10 to 18 caron atoms), or is a ballasting aryl group. The aryl ballasting group is for example of the formulae (5) or (6).

Hydrazo-anthraquinones of formula (22) may be prepared by reacting a compound of the formula (17) with a substituted phenyl hydrazine of the formula

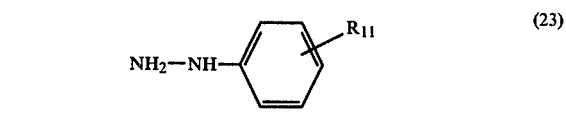
(23)

where $R_{11}$ has the meaning assigned to it above, in an alkaline medium.

Preferably $R_{11}$ is the group $-SC_{16}H_{33}$.

An example of hydrazo-anthraquinone of formula (23) is the compound of formula

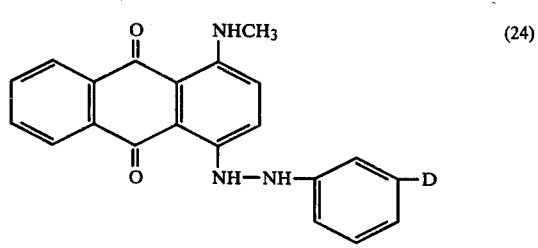
(24)

where D is the group $-SC_{16}H_{33}$ or the group of formula (5).

The following examples will serve to illustrate the invention.

EXAMPLE 1

1-Amino-4-[4-(4-(2-hydroxy-3,5-ditertamyl phenylazo) benzoylamino)-phenylamino]-9,10-anthraquinone-2-sulphonic acid (formula (14)).

Diazotized 4-aminobenzoic acid is coupled to 2,4-ditertamylphenol and the resultant azo-dye-carboxylic acid converted to its acid chloride with thionyl chloride.

The hydrochloride of 1-amino-4-(4-amino phenyl) amino-9,10-anthraquinone-2-sulphonic acid (1.0 g) is dissolved in pyridine (30 ml) cooled to 5° C. and 4-(2-hydroxhy-3,5-ditertamylphenylazo)benzoyl chloride (1.0 g) added in portions with cooling water (300 ml) and acidified with 40 ml of concentrated hydrochloric acid. The green solid is collected, washed with water until free of blue dye, then dried. A trace of the azo dye-carboxylic acid is removed by soxhlet extraction with cyclohexane. The resultant green solid formed a single spot on a chromatographic plate. (SiO₂gel/glass/1 methylalcohol/2 ethylacetate)mp. 263° C.

EXAMPLE 2

1-Hydroxy-4-[4-(4-amino-3 sulphonic acid-9,10-anthraquinonylamino)phenylazo]-2-naphth-[4-(2,4-ditertamylphenoxy)n-butylamide] (formula (9)).

The hydrochloride of 1-amino-4-(4-amonophenyl) amino-9,10-anthraquinone-2-sulphonic acid (1.11 g) is suspended in 2-methoxy ethanol (15 ml) and 1.5 ml of concentrated hydrochloric acid. The amino was diazotized by addition of sodium nitrite (0.25 g) in a little water. The mixture is added dropwise to a solution of 1-hydroxy 2-naphth[4-(2,4-ditertamylphenoxy) n-butylamide] (1.0 g) in 2-methoxy ethanol (25 ml) containing dissolved potassium acetate (4.0 g). The dark green mixture is poured into water (300 ml) and the dye collected, washed and dried.

EXAMPLE 3

1-Amino-4-(4[1-hydroxy-2-(4-[2,4-ditertamylphenoxy]butylamino carboxyl) naphth-4-ylazo]phenyl) amino anthraquinone-2,6(or 7) disulphonic acid (formula (10)).

1Amino-4-(4-aminophenyl)-anthraquinone-2,6(or 7)-dislulphonic acid disodium salt (4g) is diazotized at 0° C. with sodium nitrite (0.5 g) in aqueous hydrochloric acid, and then coupled with 1-hydroxy-2-naphth-[4-(2,4,-ditertamylphenoxy)butyl]amide (3,38 g), in 2-methoxy ethanol and potassium acetate. The dark brown product is filtered and washed with water, and recrystalised from ethanol, water, mp 115°–117° C.

EXAMPLE 4

4-[2-(3-hexadecylthio) phenyl hydrazino]-1-methyl amino anthraquinone (formula (24)).

4-Bromo-1-methyl amino anthraquinone (0.32 g), m-hexadecylthio phenyl hydrazine (0.86), potassium acetate (3 g) and cuprous chloride (20 mg) were refluxed in amyl alcohol (20 ml) for 2 hours, and the solution cooled and the blue crystals collected and washed with water, and may be purified by chromatography on silica gel.

What is claimed is:

1. An azo(hydroazo-anthraquinone compound of the formula

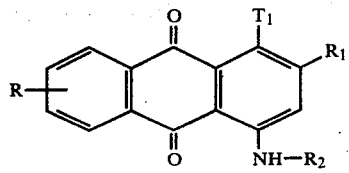

where R is hydrogen or at least one substituent, $T_1$ is a hydrogen, an hydroxy or alkoxy group or an amino or substituted amino group, $R_1$ is hydrogen, halogen, an alkoxy, an amino or substituted amino group, an aryl or substituted aryl group, or a group conferring solubility in water and $R_2$ is a group which comprises an azo linkage and a ballasting group or is a group which completes the hydrazo link and which comprises a ballasting group.

2. An azo-anthraquinone compound according to claim 1 of the formula

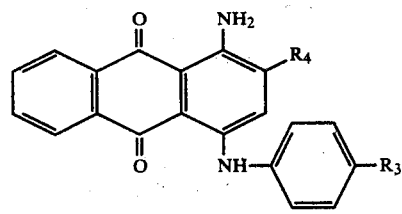

wherein $R_3$ is a group containing an azo group and a ballasting group and $R_4$ is a group which confers solubility in water.

3. An azo-anthraquinone compound according to claim 2 wherein $R_4$ is the group —$SO_3H$.

4. An azo-anthraquinone compound according to claim 3 of the formula

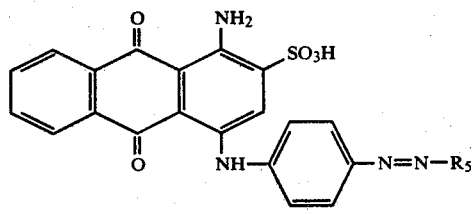

where $R_5$ is substituted aromatic or heterocyclic group containing a ballasting group.

5. An azo-anthraquinone compound according to claim 1 of the formula

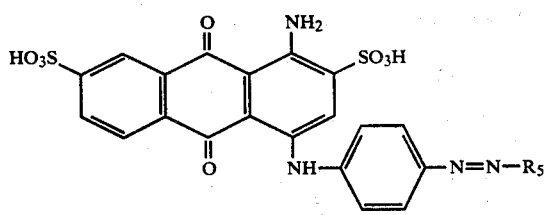

wherein $R_5$ is substituted aromatic or heterocyclic group containing a ballasting group.

6. An azo-anthraquinone compound according to claim 4 or claim 5 wherein $R_5$ is a group of the formula

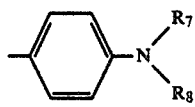

or of the formula

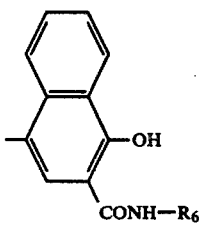

where $R_6$ is either an alkyl group containing at least 10 carbon atoms or a group containing such an alkyl group or an aryl ballasting group, and $R_7$ and $R_8$ are both alkyl containing together at least 12 carbon atoms.

7. An azo-anthraquinone compound according to claim 6 wherein $R_6$ is a group of the formula

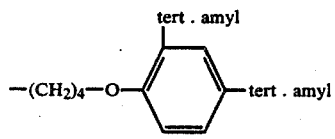

8. An azo-anthraquinone compound according to claim 1 of the formula

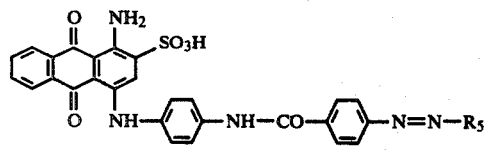

where $R_5$ has the meaning indicated in claim 6.

9. An azo-anthraquinone compound according to claim 1 of the formula

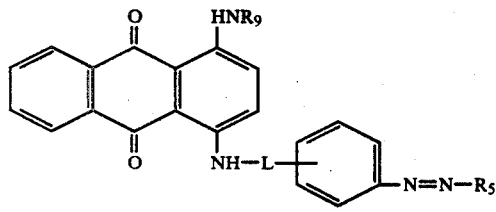

where $R_5$ has the meaning assigned to it in claim 6, $R_9$ is an alkyl group having from 1 to 4 carbon atoms and L is a linking group.

10. An azo-anthraquinone compound according to claim 9 wherein L is an amide, a quaternary ammonium compound or a phenyl group having water-solubilising substituent groups.

11. An azo-anthraquinone compound according to claim 10 of the formula

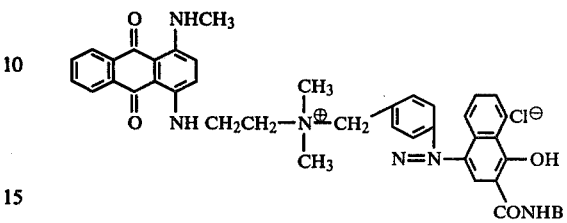

where B is the group of the formula

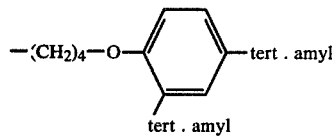

12. An azo-anthraquinone compound according to claim 1 of the formula

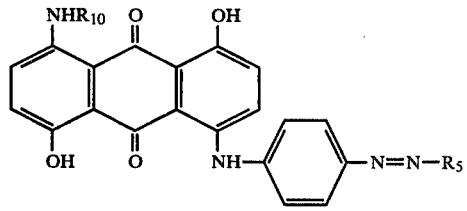

where $R_5$ has the meaning assigned to it in claim 6 and $R_{10}$ is a hydrogen atom, an alkyl group having up to 4 carbon atoms or an optionally substituted phenyl group.

13. An hydrazo-anthraquinone compound according to claim 1 which comprises an hydrazo linkage and which is of the formula

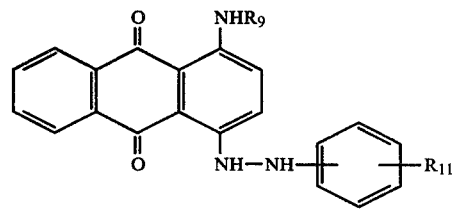

where $R_9$ is alkyl of 1 to 4 carbon atoms and $R_{11}$ is either an alkyl group containing at least 10 carbon atoms or is a group which comprises such an alkyl group, or is a ballasting aryl group.

* * * * *